July 28, 1970 R. F. BORKENSTEIN 3,522,009
BREATH SAMPLING, STORING, AND PROCESSING APPARATUS AND METHOD
Filed Dec. 5, 1966 2 Sheets-Sheet 1

INVENTOR.
ROBERT F. BORKENSTEIN
BY
Woodard, Weikart, Emhardt & Naughton
Attorneys July 28, 1970    R. F. BORKENSTEIN    3,522,009
BREATH SAMPLING, STORING, AND PROCESSING APPARATUS AND METHOD
Filed Dec. 5, 1966    2 Sheets-Sheet 2

INVENTOR.
ROBERT F. BORKENSTEIN
BY Woodard, Weikart, Emhardt & Naughton
Attorneys United States Patent Office 3,522,009
Patented July 28, 1970

3,522,009
BREATH SAMPLING, STORING, AND PROCESSING
APPARATUS AND METHOD
Robert F. Borkenstein, Bloomington, Ind., assignor to
Indiana University Foundation, Bloomington, Ind., a
corporation of Indiana
Filed Dec. 5, 1966, Ser. No. 599,182
Int. Cl. G01n 31/06, 31/22, 33/16
U.S. Cl. 23—232                                          15 Claims

ABSTRACT OF THE DISCLOSURE

A portable device including a mouthpiece, a removable alcohol collection tube, and a graduated syringe, to collect the breath sample and the alcohol therein. The alcohol is adsorbed by calcium chloride in the tube, which can be removed and stored. For later analysis of the tube content, apparatus includes a heated chamber receiving the tube, and means pumping heated air therethrough to drive out the alcohol to analyzing apparatus of whatever type desired.

BACKGROUND OF THE INVENTION

This invention pertains to sampling and processing apparatus and methods for breath samples wherein, during the collection of a known volume of breath, the alcohol therein is collected in a container for storage therein, this container being removable and then receivable in the processing apparatus which is arranged to drive the alcohol off into analyzing apparatus.

The prior art includes, among other systems, a "Drunkometer" wherein a sample of breath, collected in a balloon, is bubbled through a reagent which is decolorized when a certain amount of alcohol is caught by the reagent. The breath leaving the reagent is collected either by a water displacement method or by carbon dioxide adsorbing means and the amount of breath collected before the reagent has changed color due to alcohol, is measured. This is done by either direct measurement of water displacement volume or by weighing the carbon dioxide adsorbent before and after the test. Another prior art device known as the "Intoximeter" also uses a balloon and the subject blows into the balloon, from which a portion of the breath passes through a field test apparatus which will be changed in color sooner or later depending upon the alcoholic content of the breath. For laboratory testing, the breath sample taken in the balloon is passed through a magnesium perchlorate tube for adsorbing moisture and alcohol and also through an Ascarite tube for adsorbing carbon dioxide. The carbon dioxide amount is determined by weighing the Ascarite tube both before and after the test. The collected alcohol amount is determined by laboratory analysis, usually referred to as a "wet" analysis involving distillation of the water and alcohol. Then by comparison of the weight of alcohol and weight of carbon dioxide collected simultaneously, and knowing that deep lung "alveolar" air is 5.5% carbon dioxide by volume, the percentage of alcohol in the breath can be determined.

In another prior art device known as the "Alcometer" a sample of known volume of breath is collected and passed through iodine pentoxide for oxidation of the alcohol therein and release of a proportional amount of free iodine which is bubbled through a starch solution in a test vial producing a color measured by a colorimeter.

Another prior art device is known as the "Breathalyzer" and an early version thereof is described in my Pat. No. 2,824,789 issued Feb. 25, 1958. In that device, a known volume of alveolar breath, collected by having the subject blow into a tube, is bubbled through a potassium dichromate solution in a glass ampoule. A change of solution color intensity caused by alcohol in the sample is employed by photometric comparison with a standard to obtain a direct meter reading of percent blood alcohol.

In traffic accident prevention work, it is not only desirable to be able to obtain a measurement of alcoholic influence in drivers in accident situations, but it is also desirable to be able to survey drivers of vehicles in the usual traffic flow. It has been found that, given the proper assurances, drivers are not generally opposed to such procedures so long as their progress on their journey is not significantly delayed. To obtain a good and complete survey during normal traffic flow, it is essential that the equipment in use be simple and easy to use as well as readily transportable. Moreover, there is virtually no time for on-the-spot analysis of breath samples. Furthermore, in accident situations, it may be desirable to provide a sample for the subject himself, samples for analysis by the law enforcement authorities, and another sample or samples for analysis by an independent objective laboratory.

Efforts have been made to take and store breath samples in plastic bags, but the attendant space requirements, bag failures, and general inconvenience, have demonstrated that such an approach leaves much to be desired.

Finally it is desirable to be able not only to make a quantitative analysis of samples but also a qualitative analysis. Various prior art apparatus, being oriented primarily toward quantitative analysis, might produce an indication of high alcoholic content when the effect is not caused by Ethyl alcohol which has been drunk, but rather by some other substance such as paraldehyde, methyl alcohol, or ether. Normally it is possible to eliminate all possibilities other than the ethyl alcohol derived from beverages, by questioning the subject. However, the impact of recent court decisions, and particularly *Miranda v. Arizona*, discourages questioning of subjects, 384 U.S. 436 (1966) so that although samples can be taken, it might become mandatory to have specific qualitative analysis in independent laboratories to confirm either the on-the-spot tests or the laboratory tests by the police department. This could dictate the use of such sophisticated apparatus as gas chromatograph, and the prior art sampling and processing apparatus are not well adapted to utilization with this equipment.

SUMMARY OF THE INVENTION

Described briefly, in a typical embodiment of the present invention, a tube containing granular calcium chloride is provided in a passageway between a mouthpiece and graduated syringe, there being a vent for discharge of the initially exhaled breath to atmosphere or into a collection device. As the subject exhales, the vent is closed at the proper time in the procedure whereupon the remaining exhaled breath is passed through the collection tube for adsorption of alcohol by the calcium chloride and collection of the breath minus the alcohol up to a certain amount in the syringe, whereupon the vent is again opened and the exhalation completed. The tube can be stored for at least six weeks. For processing the tube, it is inserted in a receiver of apparatus according to this invention whereupon it is heated along with air pumped to and through the tube to a suitable temperature achieving the removal of alcohol from the tube. The alcohol is pumped out of the tube by the heated air and discharged into suitable analyzing equipment which can be the ampoule of the "Breathalyzer" analyzing instrument or can be connected to a gas chromatograph. The temperature is raised to the desired level and air pumped through the tube to discharge the alcohol therefrom into the analyzing equipment. After a period of time known to be sufficient to remove all alcohol from the tube at the tube at the temperature and air flow rate used, the pump is stopped and a valve is opened to remove any air pressure from the discharge line.

BRIEF DESCRIPTION OF DRAWING

The full nature of the invention will be understood from the accompanying drawings and the following description and claims.

DESCRIPTION OF PREFERRED EMBODIMENTS

Figures 1, 2:
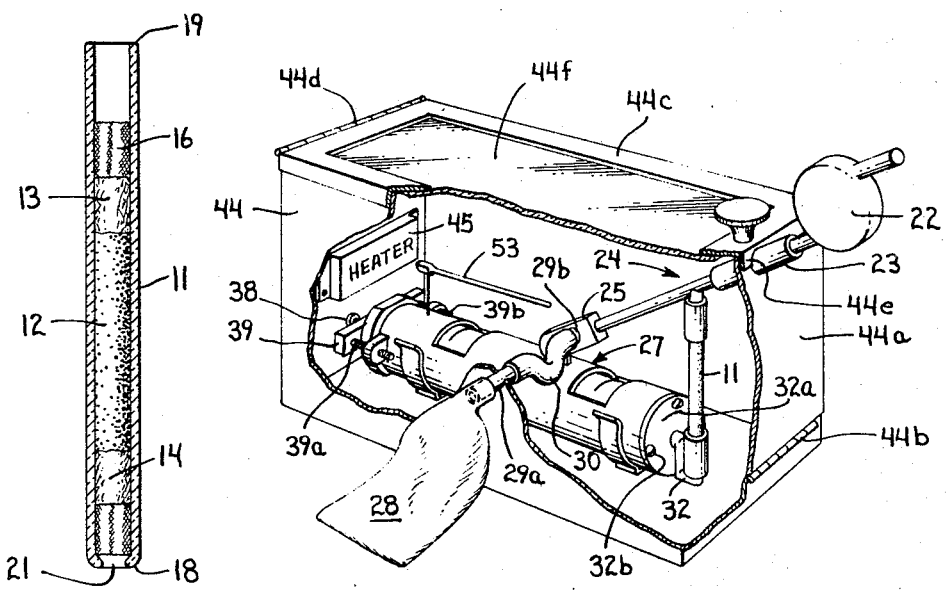
FIG. 1 is a vertical section through a sample collection and storage tube of a typical embodiment of the invention.
FIG. 2 is a cutaway perspective through the sampling apparatus portion of a typical embodiment, incorporating the sample collection tube of FIG. 1.

Referring now to the drawings in detail, a small glass tube 11 typically a ¼ inch in diameter and 2⅜ inches long is provided with a column of granular calcium chloride 12 therein received between upper and lower end packing means in the form of glass wool 13 and 14. The glass wool at the upper end is retained in position by a fine stainless steel mesh 16 annealed and stuffed into the upper end of the tube. At the lower end, the glass wool 14 is retained by fine stainless steel mesh annealed and stuffed into the lower end. The height of the calcium chloride column is approximately 1 inch and the mesh and glass wool are stuffed toward each other to an extent sufficient to avoid any channeling of the calcium chloride by air passing through the tube from the one end to the other, and yet permitting a free enough flow of air to enable a person to blow through the tube. It is preferable that at least one end of the tube be rounded as at 18 and, the other end should be rounded somewhat as at 19. Although the inside diameter of the tube at the one end should be approximately the same as the diameter throughout the main body of the tube to facilitate insertion of the powder and packing and stuffing, the lower end aperture 21 can be somewhat smaller to assist in retaining the packing and stuffing at the one end. The degree of packing of the calcium chloride is preferably such that the weight of a weighted glass piston weighing fifty grams, and 1⅛ inch diameter, moving the piston vertically downward in a glass syringe of the type shown herein, will force one hundred twenty (plus or minus 20%) milliliters (ml.) of air through the tube per minute. While calcium chloride is specifically mentioned herein, silica gel, porous glass, activated charcoal, molecular sieves or other adsorbing material may also be used.

Figure 3:
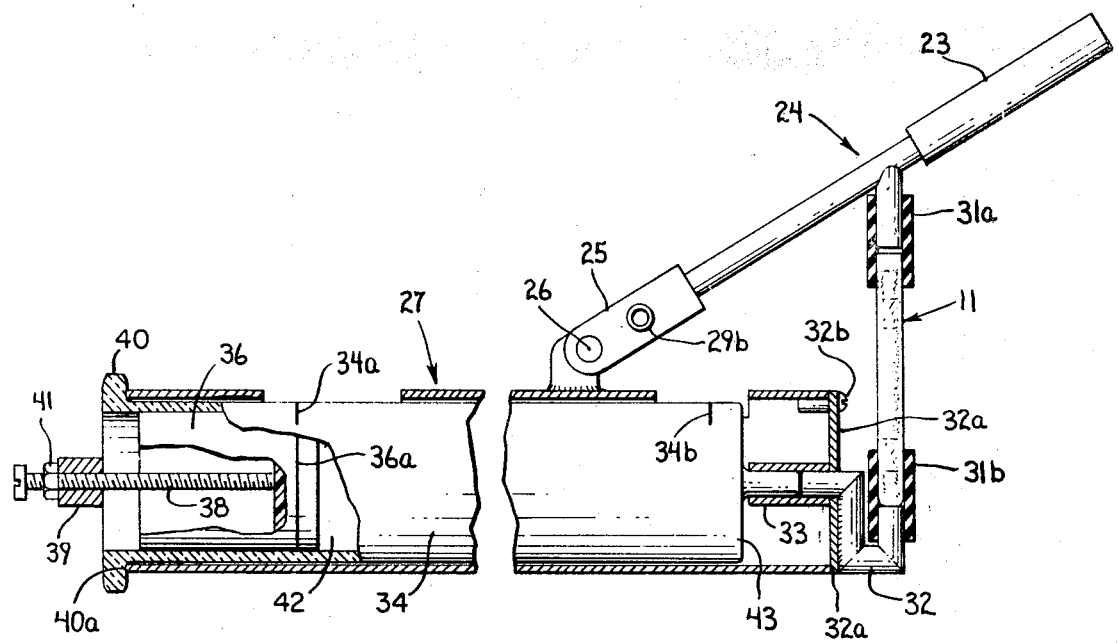
FIG. 3 is an enlarged sectional view of a portion of FIG. 2.

The sampling apparatus (FIGS. 2 and 3), in addition to the collection tube of calcium chloride, includes a combination mouthpiece and saliva trap 22, the outlet of which is connected through rubber coupling 23 to a modified T fitting 24, which is supported by a mounting block 25 pivotally mounted at 26 to the syringe housing 27. A collapsible non-resilient bag 28 is connected through rigid fittings 29a and 29b and a silicone rubber tube 30 and a communicating passageway in block 25 to one outlet of the fitting 24 while the other outlet is connected through silicone rubber fitting 31a to the upper end of the collection tube 11. The lower end is connected through a silicone rubber fitting 31b to the built-in tubular passageway 32 of the syringe housing end cover plate which is mounted to the housing by screws 32b. Rubber fitting 33 is mounted to the said tubular passageway inside the housing and is connected to the glass syringe 34 having a cup-shaped glass piston 36 therein slidable therealong to a point against the adjustable stop screw 38. This screw is threadedly received in a syringe retainer bar 39 secured to the syringe housing by two screws 39a and 39b and clamping the syringe flange 40 between the bar and the open end margin 40a of the syringe housing cylinder. The stop screw is locked in position by locknut 41 so that the circular groove 36a of the piston, and which can have red marking means therein, will be aligned with the similar mark 34a on the syringe when the volume in the chamber 42 displaced by the piston as it moves from against the wall 43 to a point against the stop screw end is a known amount. This could be fifty-two and one-half milliliters, for example. A scribe mark 34b is provided on the syringe for alignment with the mark 36a on the piston when the piston is "bottomed" or abutted against syringe end wall 43. Suitable viewing openings in the syringe housing cylinder may be provided as shown. The apparatus may be housed in an insulated housing 44 in which a conventional thermostatically controlled heating unit 45 may be provided, if desired, to keep the temperature at 45 degrees C. (Celsius) and avoid condensation in the sampling apparatus in the event it is used in a cold environment. This will enable collection of a sample corresponding to fifty-two and one-half milliliters of deep lung breath as it leaves the mouth. This conveniently obtainable amount is one-fortieth of the 2100 ml. of deep lung breath which contain the same amount of alcohol as one ml. of blood. The syringe markings may be set so that instead of defining fifty-two and one-half ml. exactly, the defined volume is that which will compensate for the rise in temperature of the breath from mouth temperature (31–34° C.) to apparatus temperature 45° C., and also compensate for the breath moisture removal of about 5% by the calcium chloride in the tube. The apparatus housing may include the front wall 44a hinged to the bottom at 44b and notched at the upper margin to accommodate the fitting 23. The lid 44c hinged at 44d has flange 44e normally holding wall 44a in place. It has a glass 44f through which the syringe and piston markings can be observed if the sample is taken with the apparatus inside the housing 44.

In the use of the apparatus described above for sampling, the bag 28 may be connected to the outlet fitting 29a with the bag in a collapsed condition. The subject takes a deep breath and then blows into the mouthpiece 22. In view of the fact that the first breath exhaled will not be deep lung breath and not representative for purposes of relating it to blood alcohol content, the capacity of the bag 28 is approximately 600 milliliters so that the first 600 milliliters of exhaled breath will fill the bag 28. Then the rest of the exhaled air will pass downwardly through the alcohol collection tube 11 and into the syringe, moving the piston 36 away from the wall 43 and toward the stop screw 38. When the piston has reached the stop, the pressure would rise unless the person either stopped blowing or the bag were further inflatable or removed. In any event, it is desirable to stop at that point and then remove the collection tube 11 and place it in a test tube with a stopper for preservation. Another approach is to omit the bag 28 and leave fitting 29a or 29b open to atmosphere. In the use of this version, the initial breath is allowed to escape to atmosphere through the fitting 29a, for example, and then the finger is placed over the outlet of the fitting 29a until the desired volume of air has passed through the collection tube and into the syringe to displace the total desired displacement volume, whereupon the finger is again released from the vent 29a, allowing the rest of the exhaled air to go to atmosphere. Then the collection tube 11 is removed and placed in the suitable stoppered test tube or other receptacle for preservation. The air in the syringe need not be saved and all of the apparatus except the particular collection tube 11 can be used for the next subject to be tested. For sanitary reasons, however, the mouthpiece is not reused.

A thermometer 53 is provided on the syringe and visible through the glass in the case so that the operator knows whether or not the volume of air collected in the syringe represents the weight of air desired within the limits necessary so that when the amount of alcohol collected in the container is later measured, the correct percentage of alcohol to air can be determined. The great advantage of collecting samples in this way is the fact that the collection unit is quite small and easily portable and the alcohol collected will be retained for long periods of time without loss. It is known that samples can easily be preserved intact in this way for at least six weeks. There is no need to retain the air collected in the syringe because the only purpose for collecting it was to be certain that a known quantity of the air from the lungs had passed through the alcohol collection tube 11.

Figure 5:
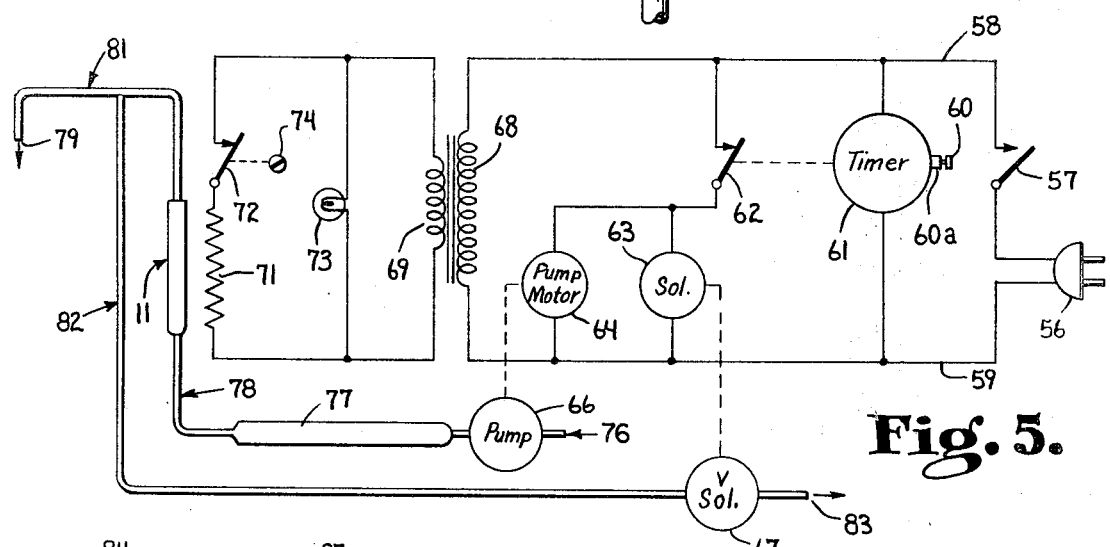
FIG. 5 is a combination electrical and air flow schematic diagram of the processing apparatus.
Figure 6:
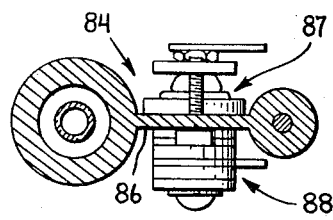
FIG. 6 is a cross section at line 6—6 in FIG. 4 and viewed in the direction of the arrows.

To analyze the alcohol content in the collection tube, a gas chromatograph or a "Breathalyzer" ampoule, or some other apparatus or device might be used. To facilitate use of such apparatus and take advantage of another important feature of the collection tube of the present invention, namely its reusability, additional apparatus is provided according to the present invention. This is represented in the combination electrical-pneumatic schematic diagram of FIG. 5 of the drawings, as well as in fragmentary manner in the enlarged diagram. The apparatus employed includes a line plug 56 connectable to an electrical outlet providing a source of electrical energy through the on-off master switch 57 to lines 58 and 59. Switch 57 may be a toggle switch, for example. A timer 61 is connected across the lines. It has a pushbutton 60 effective, when pushed, to close the timer-operated switch 62. The timer can be set by knob 60a to open the switch 62 automatically at a selected time after the button is pushed. When master switch 57 and timer switch 62 are both closed, they energize the solenoid 63 and pump motor 64. The pump motor 64 drives an air pump 66 which typically is capable of delivering 100 ml. of air per minute. The solenoid 63 is operable, when energized, to close a normally-open solenoid valve 67. Suitable timers are well known. For example, some manufactured by Cramer Division, Giannini Controls Corp., Old Saybrook, Conn., serve very well.

The lines 58 and 59 are connected across a step-down transformer primary winding 68, the secondary 69 of which is used to provide current to the heater 71 through a normally-closed, thermostatically-operated switch 72. A lamp bulb 73 is connected across the secondary winding and is energized whenever the master switch 57 is closed, and usually a red jewel is provided over the bulb to show that the apparatus is turned on. The thermostat is adjustable as indicated schematically by the screw 74 so that heat applied to the sample tube 11 by the heater 71 will not increase the temperature to more than approximately 170° C., nor allow it to drop to less than 160° F.

The pump 66, when driven by the motor 64, pumps air from atmosphere through the inlet 76 and out through an air cleaner 77 and conduit 78 through the sample container 11 and then out through the discharge outlet 79. The solenoid valve 67 is normally open, except when the solenoid is energized. Therefore, when the timer opens the switch 62, usually about three or four minutes after the pumping starts, the solenoid 63 is deenergized simultaneously with deenergization of the pump motor so as to allow the solenoid valve 67 to open. This vents the discharge passageway 81 through the vent passageway 82 and valve 67 to atmosphere at 83. The purpose of this will become more apparent as the description proceeds.

Figure 4:
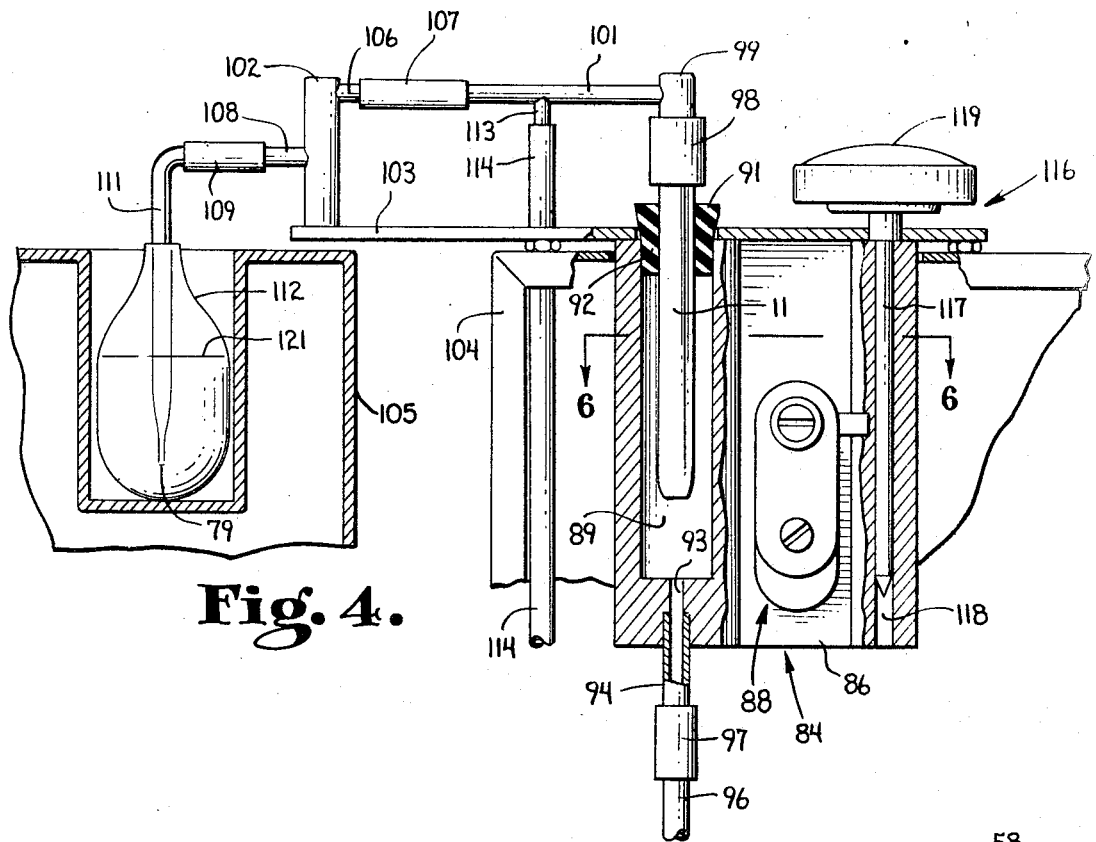
FIG. 4 is an enlarged fragmentary view of processing apparatus of the typical embodiment employing the tube of FIG. 1.

Referring now to the enlarged detailed illustration of the sample receiver and heater assembly in FIG. 4, a body 84, which may be made of aluminum, for example, is provided with a web section 86 to which an electric heater 87 and thermostat control therefor 88 are attached, these incorporating the heating element 71 and thermostatically controlled switch 72 of the schematic diagram. The body is provided with a bore 89 open at the top to receive the silicon rubber stopper 91 which receives the sample container tube 11 so that the calcium chloride column 12 is almost entirely enclosed in the chamber 89. Normally, because the rubber stopper fittingly and sealingly circularly embraces the tube 11, it is mounted to the tube first and then inserted in the chamber 89 through the upper end opening at 92. A passageway 93 is provided at the bottom of the chamber and the body receives a pipe 94 serving as an inlet to which a pipe 96 can be coupled from the pump by the coupling member 97. This arrangement serves as the conduit 78 of the schematic diagram.

Another rubber coupling 98 is fittingly and sealingly received on the upper end of the tube 11 to connect it to a metal fitting 99 from which a pipe 101 extends. A metal fitting 102 is mounted to the plate 103 affixed to the housing 104 and has an inlet 106 connected by a rubber coupling 107 to the pipe 101. The coupling 107 thus serves as a convenient hinge or universal member enabling the raising and lowering of the portion 99 to facilitate disconnection of the rubber fitting 98 from the tube 11 and removal of the tube and stopper from the heater body.

The member 102 has an outlet 108 to which a rubber coupling 109 is connected and receives a glass discharge fitting 111. The outlet of this fitting is shown submerged in the potassium dichromate solution of the ampoule 112 as is the situation when the content of the tube 11 is being analyzed by the "Breathalyzer" analysis machine. The vent conduit 82 of the schematic diagram is shown in part in the enlarged view by the branch 113 from pipe 101, to which the rubber tube 114 is attached, this tube extending to the solenoid valve 67 of the schematic diagram.

A thermometer 116 having a stem 117 received in the body bore 118, and having a dial under the glass 119, is provided so that the operator may know what the temperature of the heater body is, and thereby determine the temperature of the tube 11 as well as the air pushed through the tube from the metal pipe 94 joining the heater body as well as the passageway 93 in the heater body and the lower portion of the chamber.

In the operation of this processing apparatus, and assuming that the alcohol in the container 11 is to be analyzed in the "Breathalyzer" apparatus the discharge outlet is submerged in the potassium dichromate solution ampoule 112, and the elevation of this outlet 79 on the housing 104 is such that this can conveniently be done with the ampoule in its usual position in the "Breathalyzer" apparatus, which has a housing 105 of similar height. The ampoule 112 in this application corresponds to the ampoule 24 in my aforementioned Pat. No. 2,824,789 and, instead of flowing the breath as trapped in the "Breathalyzer" apparatus through the ampoule, the present invention pumps the alcohol from the container 11 through the ampoule. The analysis can be made in the same way as described in the aforementioned patent during the "analyze" portion of the operation.

The first step is to warm up the apparatus of the present invention by closing the master switch 57 and thereby initiating the heating of the heater body to a temperature between 160° C. and 170° C. as determined by the setting of the thermostat screw. The apparatus is then purged. This is done by substituting an empty tube in the place of the container 11, mounting it in the stopper 91, and locating it in the chamber 89 by inserting the stopper in the upper end opening. The rubber coupling 98 is then placed over the upper end of the tube 11, the timer is set for about four minutes, and the timer start button is pushed. This turns on the pump and closes the solenoid valve 67. The pump runs for a suitable period determined by the timer, and three to four minutes is usually long enough to be sure everything is clean and that there is no trace of alcohol from any previous analysis. The outlet 79 can be submerged in a fresh ampoule of potassium dichromate solution in the "Breathalyzer" for analysis to verify that everything is clean. When the set period ends, the timer stops the pump.

With the pump stopped, a sample tube to be analyzed is placed in the chamber, replacing the plain tube. The "Breathalyzer" apparatus is "zeroed" again. The timer 61 is set for a period of about four minutes and the start button is then pushed. This closes the solenoid valve 67 and starts pump 66.

Accordingly the air pump pumps air through the tube 11 and out through the discharge conduit means so that it bubbles up from the discharge outlet 79 through the potassium dichromate solution in the ampoule 112. The pump normally pumps 100 milliliters of air per minute so that during a period of four minutes approximately 400 milliliters are pumped through the system and bubbled up through the potassium dichromate solution. All of the alcohol adsorbed in the container 11 will normally be removed in three and one-half to four minutes and as it reaches the potassium dichromate solution causes a reduction in intensity of the yellow color of the solution, depending upon the amount of alcohol. After the time set on the timer, the pump motor will be shut off. Usually the pump is of a construction such that when it is shut off, there can be no back flow through it. This would tend to prevent the potassium dichromate solution from rising in the discharge tube 11 to its level in the ampoule and thus might interfere with a proper reading on the "Breathalyzer" instrument. To avoid this situation, the solenoid valve 67 opens when the solenoid 63 is deenergized simultaneously with the stopping of the pump so that all pressure in the discharge conduit is relieved through the vent conduit 82, permitting the dichromate solution to rise in the glass discharge fitting to its level at 121 in the ampoule. Then the proper reading can be taken on the "Breathalyzer" instrument. Naturally the amount of alcohol must be related to the initial volume of breath sampled when the alcohol was collected in the container 11 in order to obtain a proper impression of the alcoholic content of the breath and therefore of the blood of the subject. This is easily done by adjusting the stop in the syringe to receive the volume of breath desired to obtain the proper relationship depending on the analysis to be used. However one great advantage of the system of the present invention is the fact that it makes possible the use of varieties of analyzing equipment on the same type of sample. For example, instead of bubbling the discharge from the apparatus of the present invention through the potassium dichromate solution, it can be directed to a manometer for gas chromatography. Five-hundred twenty-five milliliters, for example, might be collected in such a manometer if fifty-two and a half milliliters of breath were initially collected in the syringe. Thus one would have a direct ten to one relationship and the chromatograph would be able to not only provide a qualitative analysis but also a quantitative analysis of the breath sample. So it is believed apparent that the present invention is well adapted to overcoming the problems encountered with prior art apparatus.

While the invention has been disclosed and described in some detail in the drawings and foregoing description, they are to be considered as illustrative and not restrictive in character, as other modifications may readily suggest themselves to persons skilled in this art and within the board scope of the invention.

The invention claimed is:
1. Breath alcohol sample processing apparatus comprising:
   a receiver for holding an alcohol sample container;
   a source of fluid pressure having an outlet;
   first fluid conduit means connected between said outlet and said receiver to convey fluid from said source to said receiver;
   and a heater connected to heat fluid forced through said receiver by said source for removing alcohol from a sample at said receiver.
2. The apparatus of claim 1 and further comprising:
   second fluid conduit means adjacent said receiver and having an inlet and an outlet,
   said sample container containing a sample and having an inlet and an outlet,
   said sample container being disposed in said receiver with the inlet of said sample container communicating with said first conduit means and isolated from said second conduit means except through the interior of said sample container, the inlet of said second conduit means being connected to the outlet of said sample container and isolated from the inlet of said sample container except through the interior of said sample container.
3. The apparatus of claim 1:
   said sample container containing said breath alcohol sample and having an inlet and an outlet;
   said reeciver including a thermal conductive body with a chamber therein heated by said heater and receiving said container and communicating with said first conduit means;
   and said receiver including a resilient mount sealingly engaging said container and said body to seal said sample container with the inlet thereof inside said chamber and the outlet thereof outside said chamber whereby said sample container provides the exclusive passageway out of said chamber for fluid forced into said chamber by said source.
4. The apparatus of claim 3 wherein:
   said sample container is a glass tube, said sample being alcohol adsorbed by calcium chloride in said tube;
   said apparatus further comprising:
   a housing, said receiver and first conduit means and said source being mounted to said housing;
   second conduit means having a first portion fixed to said housing, a second portion of resilient tubing, a third portion of rigid tubing connected to said first portion by said second portion, and a fourth portion of resilient tubing connecting said third portion to said glass tube at the said outlet thereof and readily removable therefrom to facilitate removal of said glass tube from said receiver and replacement by another glass tube with another sample therein for processing.
5. The apparatus of claim 3 and further comprising:
   an adjustable thermostat on said heater to control the temperature of said body;
   a thermometer on said body and visible to the operator to indicate to him the temperature in said body;
   second fluid conduit means having an inlet connected to the said outlet of said sample container and having an outlet for discharge of fluid forced from said first conduit means through said chamber and said container;
   said source of fluid pressure being an electrically operable air pump;
   and third fluid conduit means having an inlet and outlet therein and normally-open, electrically-closable valve therein between said inlet and outlet, the inlet of said third conduit means being connected to and communicating with said second conduit means between said inlet and outlet of said second conduit means, whereby pressure in said second conduit means is exhaustible to atmosphere during the normally-open state of said valve.
6. The apparatus of claim 5 and further comprising:
   a source of electrical energy;
   a timer and a first manually operable switch connected across said energy source;
   a timer operated switch and a drive motor for said pump in series connection across said energy source;

an operating solenoid and said timer operated switch in series connection across said energy source;

whereby said timer operated switch simultaneously energizes said motor and solenoid to start said pump and close said valve in said third conduit means.

7. The apparatus of claim 5 and further comprising:
a transformer primary winding in series with said first switch and said energy source;
a transformer secondary winding coupled to said primary winding and receiving energy therefrom;
said heater including a heating element and said thermostat including a temperature responsive switch, said element and temperature responsive switch being in series with said secondary winding;
and an indicator lamp connected across said secondary winding.

8. Breath sample acquisition and storage apparatus comprising:
a first container with a displaceable member therein for receiving and measuring a volume of breath therein, said container having an inlet to receive the breath;
a second container containing material for removing ethyl alcohol from air passing through the second container, said material retaining the removed ethyl alcohol, said second container being in an exclusive path between a mouthpiece and said first container so that air received in said first container from said mouthpiece must pass through said second container for removal of ethyl alcohol therefrom.

9. The apparatus of claim 8 wherein:
said material is calcium chloride.

10. The apparatus of claim 8 wherein the said second container is a vertically oriented tube, said material is granular and retained at both ends in the tube by glass wool, said wool being retained by annealed stainless steel mesh in said tube at outer ends of said wool, said mesh being located so as to pack said material in said tube sufficiently to avoid channeling by air flowing through but accommodating passage of air therethrough directly from human lungs by voluntary blowing exhalation.

11. The apparatus of claim 8 wherein:
said first container is a syringe and said movable member is a piston therein;
and thermostatically controlled heating means associated with said syringe to maintain a constant desired temperature thereof.

12. The apparatus of claim 8 wherein said first container is a syringe (34) and said movable member is a piston (36) therein, said apparatus further comprising:
a cylindrical syringe housing (27) receiving said syringe therein,
said syringe housing having a removable end cover (32a) thereon with tubular passageway means (32) mounted thereon, said second container (11) having an outlet end mounted to said tubular passageway means external to said housing by a first resilient tubular coupling (31b), and said syringe having an inlet stem communicating with said tubular passageway means inside said housing through a second resilient tubular coupling (33),
said syringe housing having an open end opposite said end cover, and said syringe having a flange abuttingly engaging a marginal edge (40a) of said housing at said open end and locating said syringe in said housing,
a clamping bar (39) removably mounted to said housing and clamping said flange against said open end marginal edge thereof;
an adjustable stop screw (38) threadedly received in said clamp bar and having an end extending therefrom toward said piston for abutting engagement therewith, said stop screw having a locknut thereon engageable with said bar for locking said screw at a desired adjustment;
said piston having a scribe mark (36a) thereon and said syringe having scribe marks thereon for registry of the piston scribe mark with one of the syringe scribe marks (34b) when the piston is bottomed at one end of the syringe and registry of the piston with the other syringe scribe mark (34a) when the piston is against the stop screw after displacing a desired volume in the syringe from its location of registry with the one syringe scribe mark;
said syringe housing having an intake tube (24) pivotally mounted thereto and having an inlet for connection to a mouthpiece, said intake tube having a first outlet alignable with said tubular passageway means (32) outside said housing and having a third resilient coupling tube (31a) connecting said first outlet thereof with an inlet of said second container, and said intake tube having a second outlet (29b) permitting bypassing of said first outlet by air received at the inlet of said intake tube for shunting away from said first container the first portion of air exhaled into mouthpiece by a person, but said second outlet being closable during exhalation to cause the air exhaled subsequent to closure to be passed through said second container and into said first container.

13. The apparatus of claim 12 and further comprising:
a bag of known limited volume connected to said outlet to receive the first portion of air exhaled;
and a temperature controlled housing (44) containing said syringe housing and said second tube and a portion of said intake tube.

14. A method of processing a sample containing alcohol adsorbed on an adsorbing material and comprising the steps of:
blowing heated filtered air through the sample at a temperature between 160 and 170 degrees Celsius and, for a period sufficient to remove all adsorbed alcohol from the sample;
and passing through conduit means to analyzing apparatus all of the air which has been thus blown through the sample to provide the analyzing apparatus with all of the alcohol contained in the sample.

15. The method of claim 14 and further comprising the step of:
venting a portion of the sample to atmosphere after removal of all the alcohol.

References Cited

UNITED STATES PATENTS

| | | | |
|---|---|---|---|
| 2,867,511 | 1/1959 | Harger | 23—232 XR |
| 3,119,670 | 1/1964 | Mitchell et al. | 23—232 |
| 3,196,689 | 7/1965 | Forrester et al. | 73—421.5 |
| 3,223,488 | 12/1965 | Luckey | 23—254 |

OTHER REFERENCES

Fisher, Modern Laboratory Appliances, 1962, p. 395.

MORRIS O. WOLK, Primary Examiner

R. M. REESE, Assistant Examiner

U.S. Cl. X.R.

23—254